United States Patent
Yan et al.

(10) Patent No.: US 10,997,863 B2
(45) Date of Patent: May 4, 2021

(54) METHOD FOR INTERACTION BETWEEN A TRANSPORTATION VEHICLE AND A PERSON, TOUCH DETECTION DEVICE FOR A TRANSPORTATION VEHICLE, AND TRANSPORTATION VEHICLE

(71) Applicant: VOLKSWAGEN AKTIENGESELLSCHAFT, Wolfsburg (DE)

(72) Inventors: Baixuan Yan, Wolfsburg (DE); Robert Jan Wyszka, Hannover (DE); Lennart Bendewald, Wolfsburg (DE); Adrian Haar, Hannover (DE); Johannes Tümler, Wellen (DE); Josephine Herz, Satuelle (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/865,007

(22) Filed: May 1, 2020

(65) Prior Publication Data

US 2020/0349845 A1    Nov. 5, 2020

(30) Foreign Application Priority Data

May 3, 2019    (DE) .................. 10 2019 206 424.8

(51) Int. Cl.
*B60Q 1/26*    (2006.01)
*G08G 1/16*    (2006.01)
*G08G 1/005*    (2006.01)

(52) U.S. Cl.
CPC ............. *G08G 1/166* (2013.01); *G08G 1/005* (2013.01)

(58) Field of Classification Search
CPC ............................ G08G 1/166; G08G 1/005
See application file for complete search history.

(56) References Cited

U.S. PATENT DOCUMENTS

| | | | | |
|---|---|---|---|---|
| 5,493,269 A | * | 2/1996 | Durley | .................. B60Q 1/50 180/167 |
| 9,073,476 B2 | * | 7/2015 | Nikol | .................. B60R 13/04 |
| 2015/0329080 A1 | * | 11/2015 | Blazejewski | ....... B60R 25/2027 701/2 |

(Continued)

FOREIGN PATENT DOCUMENTS

| DE | 102006012336 A1 | 11/2006 |
|---|---|---|
| DE | 102011111422 A1 | 2/2013 |

(Continued)

*Primary Examiner* — Quang Pham
(74) *Attorney, Agent, or Firm* — Barnes & Thornburg LLP

(57) ABSTRACT

A method for interaction between a transportation vehicle and at least one person located outside the transportation vehicle including touching at least one touch-sensitive area of the transportation vehicle by at least one person, transmitting a signal to a control device of the transportation vehicle via the at least one sensitive area, outputting an output signal to at least one device of the transportation vehicle via the control device, wherein the at least one person informs the transportation vehicle of an intended movement relative to the transportation vehicle via the interaction, and the output signal of the control device coordinates the movement of the transportation vehicle with the intended movement of the at least one person.

17 Claims, 4 Drawing Sheets

(56) References Cited

U.S. PATENT DOCUMENTS

| | | | | |
|---|---|---|---|---|
| 2015/0343943 | A1* | 12/2015 | Thoday | B60Q 1/38 340/435 |
| 2017/0153714 | A1* | 6/2017 | Gao | G06K 9/00798 |
| 2017/0322664 | A1* | 11/2017 | Park | G06F 3/0488 |
| 2019/0152433 | A1* | 5/2019 | Cumbo | G06F 3/0416 |
| 2019/0248326 | A1* | 8/2019 | McIntosh | G05D 1/0022 |

FOREIGN PATENT DOCUMENTS

| | | |
|---|---|---|
| DE | 102014010663 A1 | 1/2015 |
| WO | 2009155654 A1 | 12/2009 |

* cited by examiner

METHOD FOR INTERACTION BETWEEN A TRANSPORTATION VEHICLE AND A PERSON, TOUCH DETECTION DEVICE FOR A TRANSPORTATION VEHICLE, AND TRANSPORTATION VEHICLE

PRIORITY CLAIM

This patent application claims priority to German Patent Application No. 10 2019 206 424.8, filed 3 May 2019, the disclosure of which is incorporated herein by reference in its entirety.

SUMMARY

Illustrative embodiments relate to a method for interaction between a transportation vehicle and at least one person situated outside the transportation vehicle, and a touch detection device for a transportation vehicle comprising at least one touch-sensitive area on an external contour of the transportation vehicle, and a transportation vehicle comprising a motion detection device.

BRIEF DESCRIPTION OF THE DRAWINGS

Exemplary embodiments will be described below with reference to the associated drawings, in which.

DETAILED DESCRIPTION

Figure 1:
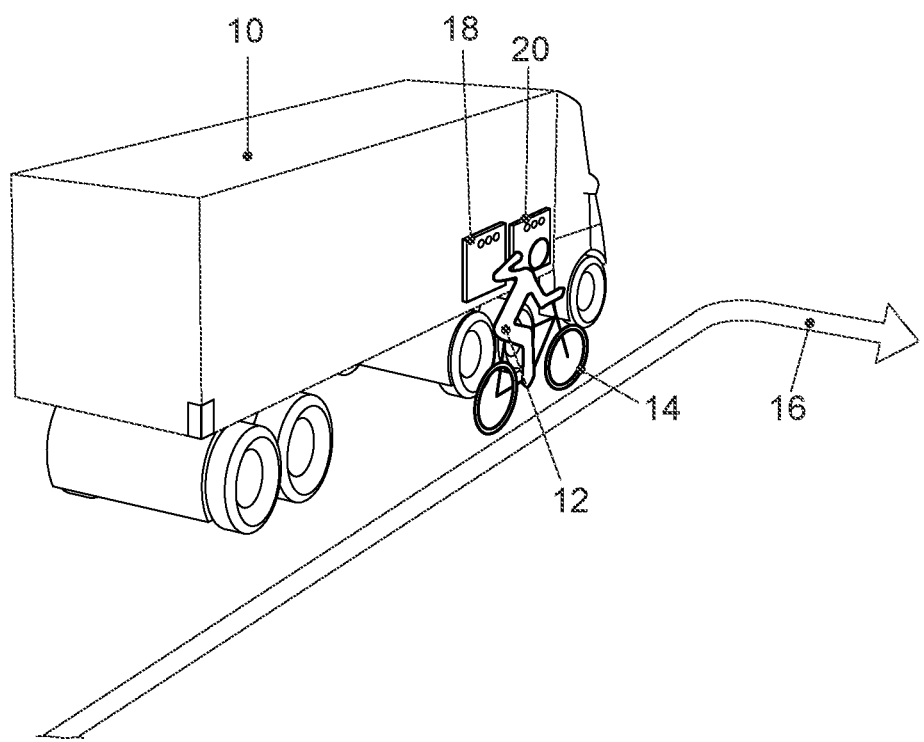
FIG. 1 depicts a schematic view of a first embodiment of a transportation vehicle with a person outside the transportation vehicle.

Methods and touch detection devices of the generic type are known. For example, DE 10 2006 012 336 A1 discloses a device and a method for touch detection for a transportation vehicle. A touch sensor and an in-vehicle evaluation device are provided. The touch sensor is, for example, configured as a piezoelectric paint which is applied to a part of a transportation vehicle and which makes electrical contact with the evaluation device, wherein the evaluation device generates at least one output signal if the piezoelectric paint touches an object.

DE 10 2011 111 422 A1 discloses a multifunction strip for a transportation vehicle which is configured as a strip-shaped trim element for a body of the transportation vehicle, and via which information can be output by the transportation vehicle driver or other road users. The multifunction strip may comprise an operating element, such as a touch-sensitive surface.

Disclosed embodiments provide a method and a touch detection device and a transportation vehicle of the generic type, for which the safety of persons situated outside the transportation vehicle can be improved.

This is achieved via the disclosed method. As a result of the fact that the at least one person informs the transportation vehicle of an intended movement relative to the transportation vehicle via the interaction, and the output signal of the control device of the transportation vehicle coordinates the movement of the transportation vehicle with the intended movement of the at least one person, it is possible to achieve an improved and safer interaction between the transportation vehicle, for example, the transportation vehicle driver, and the at least one person situated outside the transportation vehicle. Safety may thus be increased if the additional person situated outside the transportation vehicle is a cyclist and the transportation vehicle intends to turn.

In a disclosed embodiment, it is provided that the output signal of the control device prevents the transportation vehicle from continuing to travel for at least a predefinable period of time. In this case, it is achieved, with a high level of safety, that a collision with the at least one person situated outside the transportation vehicle is prevented, corresponding to the intended movement.

Furthermore, in another disclosed embodiment, it is provided that the interaction is activated only if the intended directions of movement of the transportation vehicle and the at least one person are on a possible collision course. As a result, it may be achieved that the output signal is generated by the control device only if a collision with the at least one person is actually to be expected. If the transportation vehicle, for example, continues to move in a direction of movement directed away from the person, the output signal can thus be suppressed.

In addition, in a further disclosed embodiment, it is provided that the at least one person receives feedback information via the touch-sensitive area that the transportation vehicle has registered the intended movement of the at least one person. Safety is thereby also increased for the at least one person, who knows that the communicated intended movement by the person is recognized by the transportation vehicle, and a corresponding response by the transportation vehicle itself, or in any case by a driver of the transportation vehicle, is to be expected.

In addition, in an additional disclosed embodiment, it is provided that the at least one person is moving next to the transportation vehicle on a bicycle, roller skates, a skateboard, or the like. As a result, other road users who are not motorized in any case can communicate their intended movement to the transportation vehicle in the immediate vicinity of the transportation vehicle in a simple manner.

Finally, in another disclosed embodiment, it is provided that the output signal of the control device is output acoustically and/or optically and/or haptically. Thus, the response of the transportation vehicle can be declared in a simple manner with respect to the transportation vehicle occupants and/or the at least one person situated outside the transportation vehicle.

This is achieved via the disclosed touch detection device for a transportation vehicle. As a result of the fact that a signal output circuit of a control device of a transportation vehicle is designed in such a way that an intended movement of at least one person who is situated next to the transportation vehicle is detectable via at least one touch-sensitive area on an external contour of the transportation vehicle, and as a function thereof, at least one output signal can be output to the transportation vehicle and/or a transportation vehicle driver, it is achieved that the transportation vehicle is equipped with an assistance system in a simple manner, which acts to increase traffic safety.

In a disclosed embodiment, it is provided that the touch-sensitive area is arranged on the external contour of the transportation vehicle, circumferentially around the transportation vehicle, and at a level which is easily reachable by persons situated next to the transportation vehicle. As a result, the communication interaction between the person in the transportation vehicle may be triggered in a simple way, regardless of where the person is currently situated.

In addition, in another disclosed embodiment, it is provided that the touch-sensitive area is simultaneously a display device. As a result, it is possible to signal to the at least one person that communication by the person with the transportation vehicle is successful and that the transportation vehicle is starting an interaction with the person.

This is furthermore achieved via the disclosed transportation vehicle.

FIG. 1 depicts a transportation vehicle which is labeled in its entirety by 10, and which is a truck in the depicted exemplary embodiment. The transportation vehicle 10 is stopped at an intersection, entry, or the like, of a road, which is not depicted in greater detail. A person 12 is situated next to the transportation vehicle, who, in the presently depicted example, is en route on a bicycle 14. Corresponding to the depicted arrow 16, the transportation vehicle 10 intends to turn right at the intersection or the like.

The transportation vehicle 10 has two touch-sensitive areas 18 and 20 on its external contour, here, on the side paneling of the right side of the transportation vehicle 10. The touch-sensitive areas 18 and 20 are labeled differently and may optionally be touched by the person 12. The touch-sensitive area 18 is inscribed with the inscription "I will wait," and the touch-sensitive area 20 is inscribed with the inscription "I will ride."

By touching one of the touch-sensitive areas 18 or 20 by the person 12, an intended movement of the person is immediately communicated to the transportation vehicle.

The transportation vehicle 10 can now correspondingly respond, in a manner which will be described in greater detail below, by, for example, not continuing to travel and waiting until the person 12 indicates to the transportation vehicle driver or a suitable detection system of the transportation vehicle that the person has left the immediate surrounding area of the transportation vehicle 10.

If the person 12 actuates the touch-sensitive area 18 to indicate that the person will wait, the transportation vehicle may leave the intersection area, and the person 12 will take the initiative to resume movement, after the transportation vehicle 10 has completed a turning maneuver.

The touch-sensitive areas 18 and 20 may be provided on defined or freely selectable areas on the external contour of the transportation vehicle. The touch-sensitive areas 18 and 20 are connected to a control device (see FIG. 4) of the transportation vehicle 10 in either a wired or wireless manner. There is a direct interaction by the external contour of the transportation vehicle 10, and thus a simple interaction between the person 12 and the transportation vehicle 10.

Figure 2:
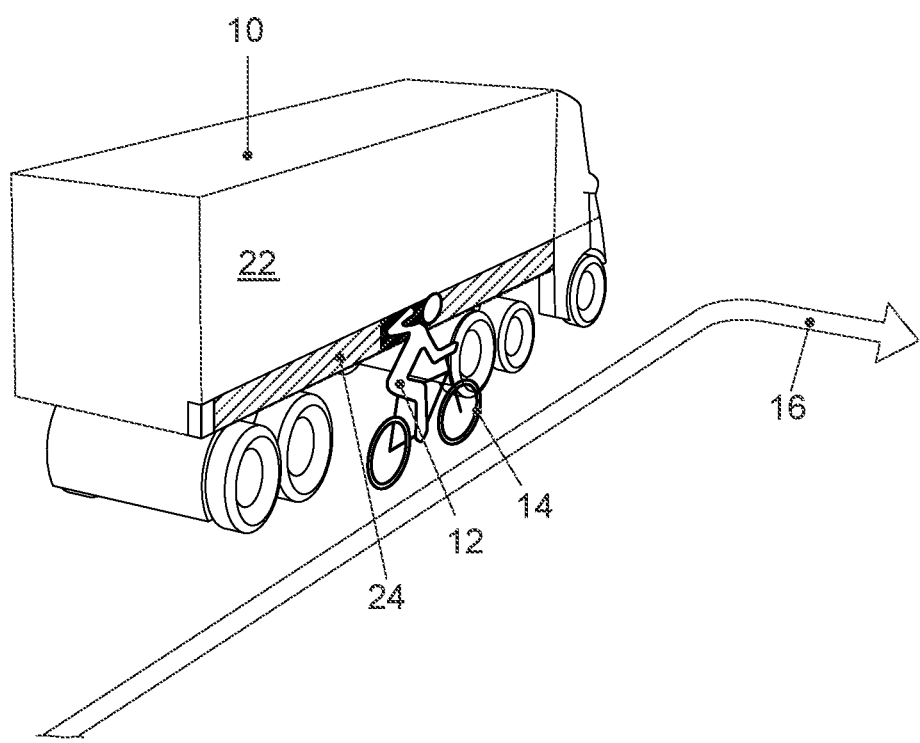
FIG. 2 depicts the a second embodiment of the transportation vehicle with the person outside the transportation vehicle.

FIG. 2 shows an additional exemplary embodiment, wherein features which are identical to those in FIG. 1 are provided with identical reference characters and are not described again.

In this case, the transportation vehicle 10 has a touch-sensitive area 24 on its right side 22 which extends over the entire length of the transportation vehicle 10.

According to the embodiment depicted in FIG. 2, the transportation vehicle 10 intends to turn right at the intersection, corresponding to the arrow 16. The person 12 recognizes this based on the turn signals set by the transportation vehicle 10. By touching the touch-sensitive area 24, it may be communicated to the transportation vehicle 10 or a transportation vehicle driver that the person 12, in this case, on the bicycle 14, is situated next to the transportation vehicle 10, and that the person wants to ride straight ahead on the road. The intended movement of the person 12 is thus not to turn corresponding to the arrow 16, but to ride straight ahead. The transportation vehicle 10 or the transportation vehicle driver recognizes this and can postpone the intention to turn until the person 12 on the bicycle 14 has visibly passed the transportation vehicle 10.

Figure 3:
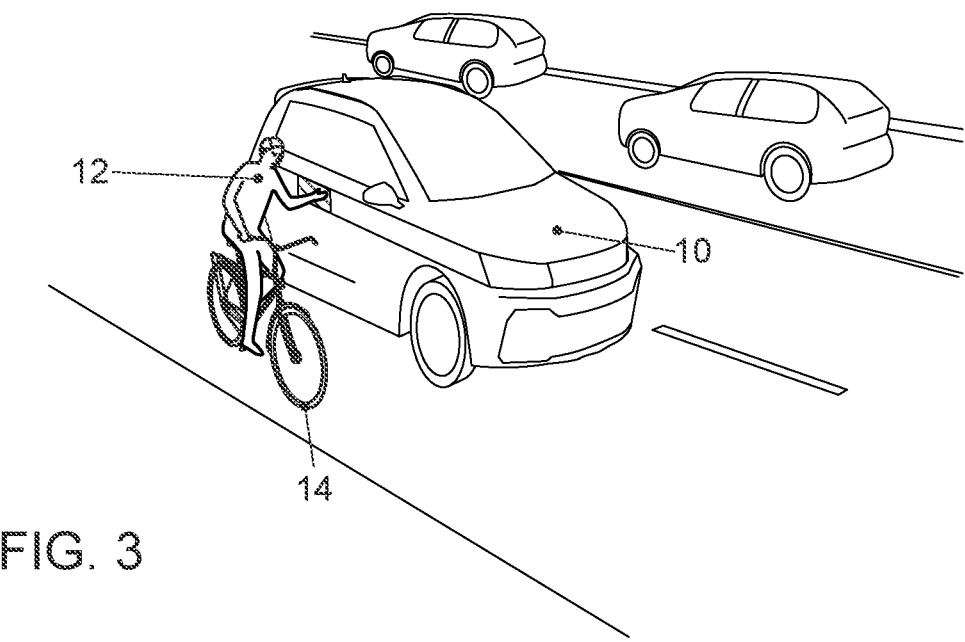
FIG. 3 depicts an additional exemplary embodiment of a transportation vehicle with a person next to the transportation vehicle.

FIG. 3 shows an exemplary embodiment in which the transportation vehicle 10 is formed by a passenger transportation vehicle. It is illustrated that the touch-sensitive areas 18, 20 and/or 24 can be provided not only in the case of trucks, for which there is frequently a limited view to the right side, but can also be provided in the case of passenger transportation vehicles, to increase safety and to produce a possible interaction between the transportation vehicle 10 and a person 12 situated next to the transportation vehicle.

Figure 4:
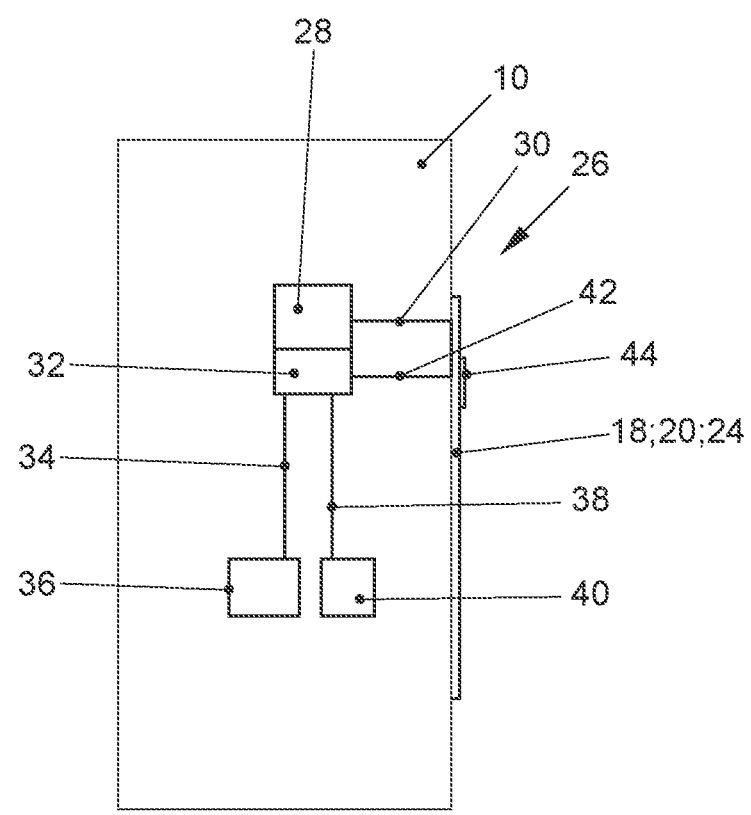
FIG. 4 depicts a circuit arrangement of the disclosed touch detection device.

FIG. 4 shows a schematic block diagram of the touch detection device 26. The transportation vehicle 10 is equipped with the touch-sensitive area 18, 20 and/or 24. As already described, the touch-sensitive area 24 may, for example, be arranged around the entire circumference of the transportation vehicle 10.

A control device 28 is provided inside the transportation vehicle which is connected to the touch-sensitive area 18, 20 and/or 24 via a signal line 30. The signal line 30 may be configured in a wired or wireless manner.

A signal output circuit 32 is associated with the control device 28, which is connected to a device 36 via a signal line 34 for influencing the driving behavior of the transportation vehicle 10.

The signal output circuit 32 is furthermore connected to a signal transmitter 40 of the transportation vehicle 10 via a signal line 38. The signal transmitter 40 can effectuate acoustic and/or optical and/or haptic signaling.

The signal output circuit 32 is furthermore connected to the touch-sensitive area 18, 20 and/or 24 via a signal line 42. The sensitive area 18, 20 and/or 24 may comprise an integrated or additional indicating device 44. The indicating device 44 may comprise a display, an illumination method or mechanism, or another suitable indicating method.

The touch detection device 26 depicted in FIG. 4 depicts the following function.

If the touch-sensitive area 18, 20 and/or 24 is touched by a person not depicted in FIG. 4, a corresponding signal is supplied to the control device 28 via the signal line 30. The control device 28 detects the signal and activates the signal output circuit 32. The signal output circuit 32 may then issue a control command via the signal line 34 of the device 36, which causes the device to prevent further travel of the transportation vehicle 10.

The signal output circuit 32 may furthermore transmit a trigger signal to the signal transmitter 40 via the signal line 38 for performing optical and/or acoustic and/or haptic signaling.

The signal output circuit 32 may furthermore a trigger signal via the signal line 42 to the indicating device 44, for depicting a certain piece of information which is intended for the person touching the touch-sensitive areas 18, 20 and/or 24.

According to exemplary embodiments which are not depicted, it may be provided that in the case of the approach by a person 12, the touch-sensitive area 18, 20 and/or 24 automatically moves outwardly from the contour of the transportation vehicle 10 and thus approaches the person 12 for better accessibility.

The touch-sensitive areas 18, 20 and/or 24 may also be selected in such a way that an approach by the person or a body part of the person is sufficient to trigger the signaling at the control device 28, without the person 12 directly touching the touch-sensitive areas 18, 20 and/or 24.

The touch-sensitive areas 18, 20 and/or 24 may also be selected in such a way that a gesture control, i.e., a certain hand movement, is detected, for example, for activating the control device 28.

LIST OF REFERENCE CHARACTERS

10 Transportation vehicle
12 Person
14 Bicycle
16 Arrow
20 Touch-sensitive areas
22 Touch-sensitive areas
22 Side
24 Touch-sensitive areas
26 Touch detection device
28 Control device
30 Signal line
32 Signal output circuit
34 Signal line
36 Device
38 Signal line
40 Device
42 Signal line
44 Indicating device

The invention claimed is:

1. A touch detection device for a transportation vehicle, the touch detection device comprising:
   at least one touch-sensitive area on an external contour of the transportation vehicle to communicate an intended movement of at least one person situated next to the transportation vehicle during a movement of the transportation vehicle;
   a control device connected to the at least one touch-sensitive area in wired or wireless manner; and
   a signal output circuit of the control device,
   wherein the control device detects the intended movement and activates the signal output circuit to output at least one output signal to the transportation vehicle and/or a transportation vehicle driver in response to the communication of the intended movement of the at least one person relative to the movement of the transportation vehicle.

2. The touch detection device of claim 1, wherein the touch-sensitive area comprises an indicating device.

3. The touch detection device of claim 1, wherein the touch-sensitive area extends around the entire circumference of the transportation vehicle.

4. The touch detection device of claim 1, wherein the at least one output signal to the transportation vehicle prevents the transportation vehicle from continuing to travel for at least a predefinable period of time.

5. The touch detection device of claim 1, wherein an interaction between the at least one person and the transportation vehicle is activated only in response to an intended direction of the movement of the transportation vehicle and the at least one person being on a possible collision course.

6. The touch detection device of claim 1, wherein the at least one person receives feedback information via the touch-sensitive area that the transportation vehicle registered the intended movement of the at least one person.

7. The touch detection device of claim 1, wherein the at least one person is moving next to the transportation vehicle using a self-propelled mechanism.

8. The touch detection device of claim 7, wherein the self-propelled mechanism is a bicycle, roller skates, or a skateboard.

9. The touch detection device of claim 1, wherein the at least one output signal is output acoustically and/or optically and/or haptically.

10. A transportation vehicle comprising the touch detection device of claim 1.

11. A method for interaction between a transportation vehicle and at least one person located next to the transportation vehicle, the method comprising:
    touching at least one touch-sensitive area installed on an external contour of the transportation vehicle by the at least one person;
    transmitting a signal to a control device of the transportation vehicle via the at least one touch-sensitive area to communicate an intended movement of the at least one person during a movement of the transportation vehicle; and
    outputting an output signal to at least one device of the transportation vehicle via the control device,
    wherein the at least one person informs the transportation vehicle of the intended movement relative to the transportation vehicle via the touching the at least one touch-sensitive area, and the output signal of the control device coordinates the movement of the transportation vehicle with the intended movement of the at least one person in response to the detection of the intended movement of the at least one person relative to the movement of the transportation vehicle.

12. The method of claim 11, wherein the output signal of the transportation vehicle prevents the transportation vehicle from continuing to travel for at least a predefinable period of time.

13. The method of claim 11, wherein the interaction between the at least one person and the transportation vehicle is activated only in response to an intended direction of the movement of the transportation vehicle and the at least one person being on a possible collision course.

14. The method of claim 11, wherein the at least one person receives feedback information via the touch-sensitive area that the transportation vehicle registered the intended movement of the at least one person.

15. The method of claim 11, wherein the at least one person is moving next to the transportation vehicle using a self-propelled mechanism.

16. The method of claim 15, wherein the self-propelled mechanism is a bicycle, roller skates, or a skateboard.

17. The method of claim 11, wherein the output signal is output acoustically and/or optically and/or haptically.

* * * * *